United States Patent [19]

Kato et al.

[11] Patent Number: 4,843,454
[45] Date of Patent: Jun. 27, 1989

[54] SEMICONDUCTOR PRESSURE TRANSDUCER

[75] Inventors: Yukihiro Kato, Kariya; Hiroshi Okada, Hekinan; Yoshifumi Watanabe; Osamu Ina, both of Anjo; Osamu Ito; Iwao Yokomori, both of Kariya, all of Japan

[73] Assignee: Nippondenso Co., Ltd., Kariya, Japan

[21] Appl. No.: 934,847

[22] Filed: Nov. 25, 1986

[30] Foreign Application Priority Data

Nov. 26, 1985 [JP] Japan .................. 60-266987
Sep. 3, 1986 [JP] Japan .................. 61-207206

[51] Int. Cl.4 ..................... H01L 23/12; H01L 23/04; H01L 21/447
[52] U.S. Cl. ........................ 357/79; 357/74; 357/80
[58] Field of Search .............. 357/74, 79, 17, 19, 357/30, 80

[56] References Cited

FOREIGN PATENT DOCUMENTS

| 53-23286 | 3/1978 | Japan . |
| 59-36835 | 9/1984 | Japan . |
| 59-159573 | 9/1984 | Japan . |
| 61-91533 | 5/1986 | Japan . |

OTHER PUBLICATIONS

Journal of Nippondenso Technical Disclosure, one page (108), Mar. 15, 1985, with abstract in English.

Primary Examiner—Andrew J. James
Assistant Examiner—S. V. Clark
Attorney, Agent, or Firm—Cushman, Darby & Cushman

[57] ABSTRACT

A semiconductor pressure transducer comprises a metal housing having a cylindrical recess to which an inlet passage of a medium to be measured is opened, a glass base being received in the recess and having a large diameter cylindrical portion and a small diameter cylindrical portion integrally connected to the large diameter cylindrical portion, a rubber O-ring interposed between a bottom of the recess and the base, a metal tubular collar disposed in the recess around the base to come into contact with the bottom of the recess, the collar urged by a caulked portion of the housing to press the base, a sensor chip provided on an end of the small diameter cylinder of the base for generating an electric signal in response to pressure of said medium, an annular clearance provided between the collar and the base, and an introducing passage provided in the base for introducing the medium from the inlet passage to the sensor chip.

22 Claims, 3 Drawing Sheets

SEMICONDUCTOR PRESSURE TRANSDUCER

BACKGROUND OF THE INVENTION

The present invention relates to a semiconductor pressure transducer for high pressure, and more particularly to a transducer in which a convex base on which a sensor chip is mounted is air-tightly fixed on a housing while reducing an adverse effect of external stress.

In a conventional high pressure semiconductor pressure transducer, in order to fixed a base in place, which mounts a sensor chip and is made of glass or the like, the base is soldered or welded to an intermediate base member made of metal such as KOVAL ® having substantially the same linear expansion coefficient as that of the base as KOVAL (registered trade mark). Then, such intermediate base member is fixed to a housing or the like.

The above-mentioned conventional fixture means is complicated in shape or is inferior in working property because stress caused by heat in an environmental portion must be prevented from being applied to the sensor chip. Inversely, if the shape of the fixture means is simplified, stress will be applied to the sensor chip, resulting in degradation in temperature characteristics.

SUMMARY OF THE INVENTION

In order to overcome the above-mentioned defects, according to the present invention, there is provided a semiconductor pressure transducer in which a sensor chip is mounted on an upper end of a convex base which is pressed at a shoulder or stepped portion thereof against a bottom of a recess in a housing through a collar, and a periphery of the collar member is press-fitted by a part of the housing, and in which an O-ring is interposed between the base and the bottom of the recess in the housing.

According to the present invention, a clearance is provided in a periphery of the base.

Thus, since the base is hardly thermally stressed and is hardly stressed upon fixing of the base to the housing, the sensor chip receives exclusively a pressure from a medium to be measured. Therefore, measuring accuracy is enhanced. Also, any collision shock is not applied to the base during press-fitting of the collar member, so that the base will not be broken.

DETAILED DESCRIPTION OF THE PREFERRED EMBODIMENTS

Figure 1:
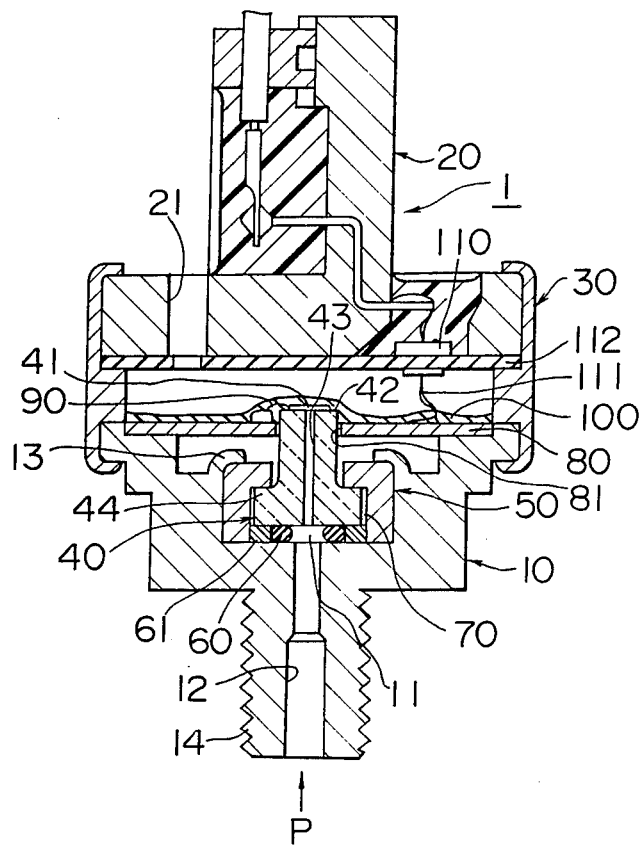
FIG. 1 is a longitudinal sectional view showing a semiconductor pressure transducer in accordance with a first embodiment of the invention.
Figure 2:
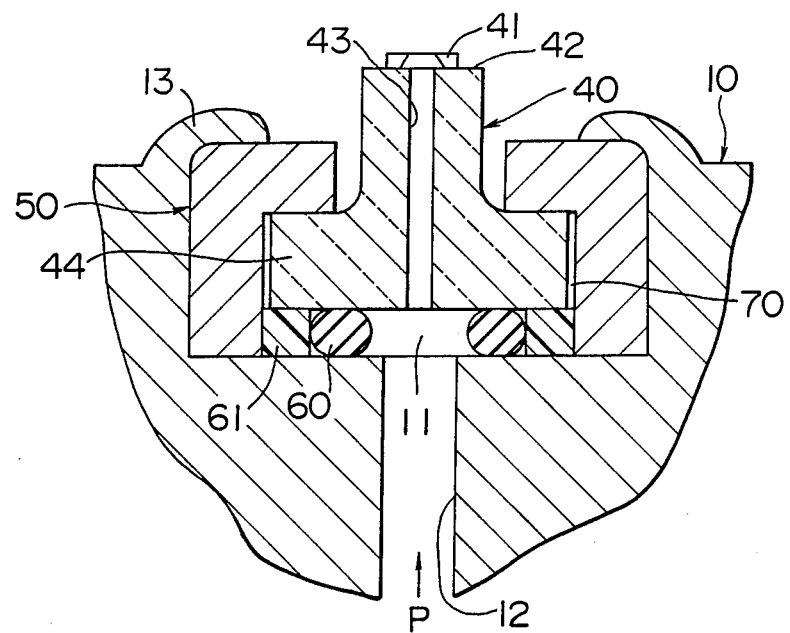
FIG. 2 is a fragmentary enlarged sectional view showing the transducer of FIG. 1.

In FIGS. 1 and 2, the transducer 1 comprises a first metal housing 10, a second housing 20, a third metal housing 30 which combines the first housing 10 with the second housing 20, a convex base 40 made of glass (e.g. Pyrex glass (registered trade mark)) and a tubular metal collar 50. The first housing 10 is provided integrally with a cylindrical recess portion 11 to which an inlet passage 12 for a medium P to be measured (e.g. hydraulic pressure) is opened, a press-fit portion 13 disposed adjacent to an open end of the recess portion 11 and a threaded portion 14. The base 40 is provided with a sensor chip 41 composed of a semiconductor pressure sensitive element or the like, which is secured onto a top end surface 42 of the base 40 by an anode bonding technique, and with an introducing passage 43 therein through which the medium to be measured is introduced to the sensor chip 41. An annular rubber O-ring 60 and a back-up ring 61 made of soft material such as Teflon (registered trade mark) are interposed between the base 40 and the bottom of the recess portion 11, thereby maintaining a sealability against the medium to be measured such as oil or the like. The tubular metal collar 50 is located in the recess portion 11 around the base 40 and is urged at an upper end thereof to press the base 40 so as to compress the O-ring 60 and the back-up ring 61 by caulking (i.e. squeeze-forming) the press-fit portion 13 as shown. The back-up ring 61 prevents the base 40 and the O-ring 60 from laterally moving, and can improve vibration resistance. In order to reduce stress applied from the caulked press-fit portion 13 to the base 40, the press-fit portion 13 is so caulked that a radial inner end of the caulked portion 13 is located radial outside of an enlarged portion 44 of the base 40. Namely, the press-fit portion 13 is not located above the enlarged portion 44 of the base 40. The collar 50 is so disposed and formed that a suitable annular clearance 70 is defined between the collar 50 and the enlarged portion 44 of the base 40. Accordingly, stress applied radially inwardly from the collar 50 to the base 40 may be considerably reduced. The material of the base 40 is not limited to glass but may be other generally fragile material.

The transducer 1 further comprises a hybrid IC board 80 on which an output compensation circuit and an amplification circuit are mounted. The board 80 is provided in the central portion thereof with an opening 81 through which the top end surface 42 of the base 40 is exposed. The sensor chip 41 mounted on the top end surface 42 is electrically connected to the circuits on the board 80 by bonding wires 90. The circuits on the board 80 and the sensor chip 41 are protected and covered by a silicone gel layer 100. The board 80 is secured to the housing 10 by an adhesive layer 82 (see FIG. 3). The signals from the sensor chip 41 are picked out through a feed-through type capacitor 110 by lead wires 111 which extend through an electromagnetic shield plate 112. The second housing 20 is provided with a penetrating bore 21 through which atmospheric pressure is applied to the sensor chip 41.

The operation of the above-mentioned embodiment will be described hereinafter.

The medium P to be measured is introduced and applied to the sensor chip 41 through the inlet passage 12 and the introducing passage 43 and the pressure of the medium P is converted into an electric signal. The electric signal is transmitted through the bonding wires 90 to the circuits on the board 80, is processed with a temperature compensation and is amplified.

With such an arrangement, the stress from the collar 50 to the sensor chip 41 on the base 40 is reduced by the convex shape of the base 40. In addition, the upper surface of the enlarged portion 44 of the base 40 is press-contacted with the collar 50, and the clearance 70 is provided between the base 40 and the collar 50. Accordingly, the stress caused by press-fitting of the portion 13 is applied to the enlarged portion 44 solely in a vertical direction. The radial component of such stress to the base 40 can be eliminated. Thus external stress and thermal stress applied to the base 40 and to the sensor chip 41 can be considerably reduced. Moreover, since the base 40 can be fixed by caulking, (i.e. squeeze-forming) mass-productivity is enhanced, with an economical advantage.

Further, squeezing of the O-ring 60 can be controlled by changing the dimension of the collar 50, so that high sealability is readily obtained. Also, since the caulking of the press-fit portion 13 is so carried out through the collar 50 that the radial inner end of the caulked portion 13 is located radially outside of the enlarged portion 44 of the base 40, no collision shock is applied to the base 40 thereby preventing it from being broken.

Figure 3:
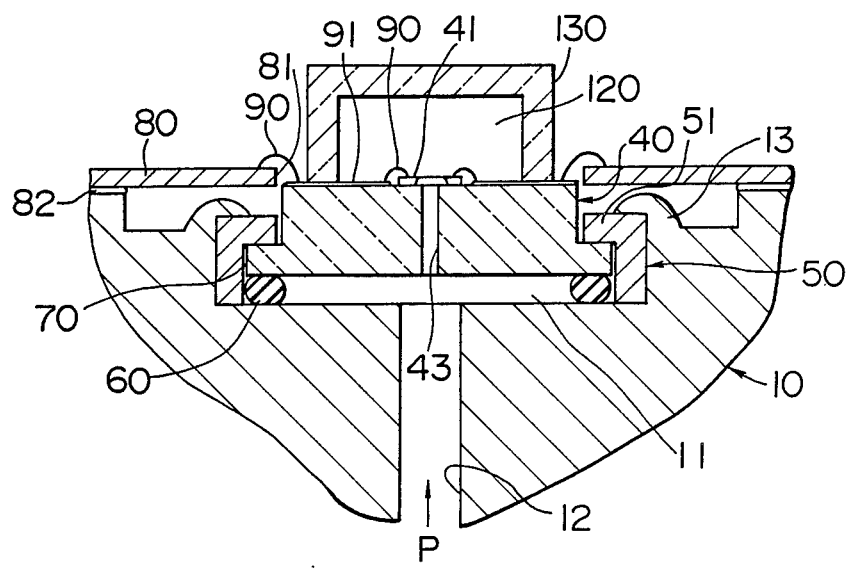
FIGS. 3 and 4 are fragmentary enlarged sectional views showing transducers in accordance with second and third embodiments of the invention, respectively.

FIG. 3 shows a second embodiment of the invention. There is shown an absolute pressure-type transducer in which a vacuum chamber 120 is provided by bonding a glass cap 130 to a glass base 40 with a low melting point glass. The base 40 is sandwiched at an enlarged portion 44 thereof between a pressing projection 51 of the collar 50 and an O-ring 60. The collar 50 and the O-ring 60 are so arranged that the stress center of the pressing projection 51 substantially coincides with that of the O-ring 60. The collar 50 is fixed to a recess portion 11 of a housing 10 by caulking a press-fit portion 13 of the housing 10 against an axial end of the pressing projection 51 of the collar 50. In this embodiment, the signal from the sensor chip 41 is transmitted through bonding wires 90 and a conductor 91 to the circuits on the board 80.

In second embodiment a structure is provided in which stress generated by fixing of the base 40 is not applied to the sensor chip 41. For this reason, it can be possible to locate the O-ring 60 so as to substantially face the pressing projection 51 of the collar 50 (that is, the stress centers of the pressing projection 51 and the O-ring 60 coincide ). Accordingly, the stress from the pressing projection 51 is cancelled out by the reaction from the O-ring 60, so that bending stress to be applied to the base 40 is suppressed.

Figure 4:
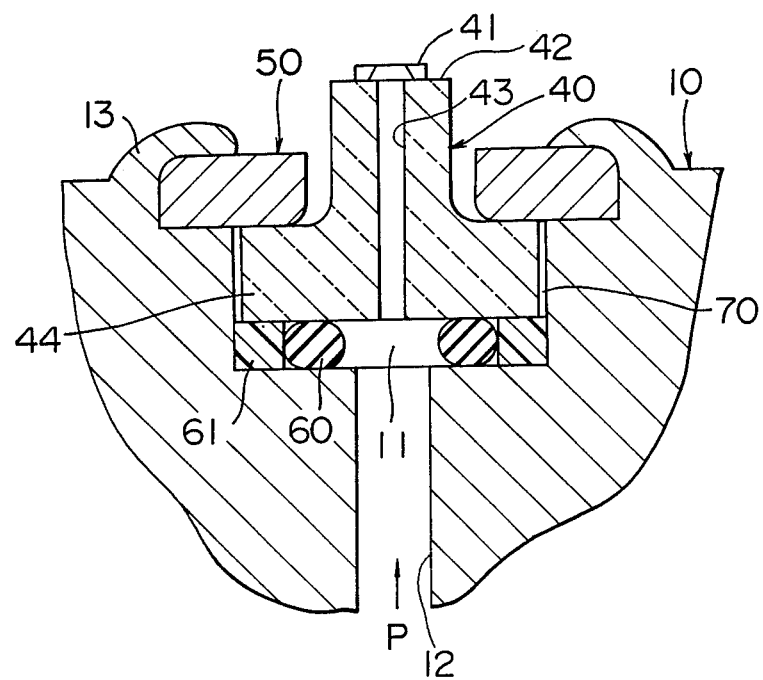

FIG. 4 shows a third embodiment of the invention. The third embodiment is different from the first embodiment as to the structure of the collar 50. The collar 50 has a function to press the base 40 on the axial end of an enlarged portion 44 thereof in the same manner as in the first embodiment. However, squeezing of the O-ring 60 is controlled in accordance with the depth of a recess portion 11, whereas according to the first embodiment, such squeezing is controlled in accordance with the dimension of the collar 50.

According to the present invention, the clearance 70 is provided between the base 40 and the collar 50 or the housing 1, and the base 40 is supported by the O-ring 60 during caulking of the pressing portion 13. Thus, the present invention may enjoy the following meritorious advantages.

(1) Since the glass base is fixed by the caulking operation, mass-productivity is enhanced, with an economical merit.

(2) Since the glass base is hardly affected by the physical stress or the thermal stress, the sensor chip receives exclusively stress caused by a medium being measured.

(3) Since no adhesion of the glass base to the metal member, e.g. the metal housing is required, the cost is lowered.

(4) Since squeezing of the O-ring is controlled by a dimension of the collar, a high sealability can be readily obtained.

(5) Any collision shock is not applied to the glass base during the caulking operation, and hence there is no fear that the glass base would be broken, and the vibration resistance can be improved.

What is claimed is:

1. A semiconductor pressure transducer, comprising:
   a housing having wall means defining a recess therein, said wall means including a bottom wall perimetrically surrounded by a sidewall to define said recess;
   a generally cylindrical basee having a larger diameter portion axially adjoining a smaller diameter portion, said smaller diameter portion providing a smaller diameter end surface, said larger diameter portion providing a larger diameter end surface, and an axially-facing annular shoulder being defined on said base between said larger diameter portion and said smaller diameter portion;
   said larger diameter portion of said base being recieved in said recess and supported therein with said larger diameter end surface positioned in confronting adjacent relationship to said bottom wall of said recess;
   an annular collar having a radially inwardly projecting annular flange means, said annular flange means having an inner diameter which is smaller than the outer diameter of said larger diameter portion of said base, but larger than the outer diameter of said smaller diameter portion of said base;
   said annular collar being received in said recess and supported on said housing by said wall means defining said recess, with said annular flange means spacedly circumferentially surrounding said smaller diameter portion of said base and axially engaging said annular shoulder;
   a press-fit portion attached to said housing, said press-fit portion being press fit radially inwardly into axially pressing engagement with said annular collar, for urging said generally cylindrical base, via said radially inwardly projecting flange means and said axially facing annular shoulder of said base, axially towards said bottom wall of said recess and thereby firmly mounting said base to said housing in said recess;
   a sensor chip for generating an electric signal in response to pressure in a medium for measuring said pressure, said sensor chip being mounted onto said smaller diameter end surface of said generally cylindrical base; and
   means for transmitting pressure from said medium to said chip through said housing.

2. The semiconductor pressure transducer of claim 1, wherein:
   said annular collar has a radially outer annular base portion which radially intervenes between said larger diameter portion of said generally cylindrical base and said sidewall of said wall means, said radially outer annular base portion being attached to said radially inwardly projecting annular flange means.

3. The semiconductor pressure transducer of claim 2, wherein:
   said annular collar is supported on said base by having an axially-facing end surface of said annular base portion thereof engage said bottom wall of said recess radially outwardly of said larger diameter end surface of said generally cylindrical base.

4. The semiconductor pressure transducer of claim 3, further including:
an annular back-up ring axially interposed between and engaging said larger diameter end surface of said generally cylindrical base and said bottom wall of said recess.

5. The semiconductor pressure transducer of claim 1, further including:
means defining a passageway axially through said generally cylindrical base, said passageway communicating said larger diameter end surface with said sensor chip through said smaller diameter end surface;
a resilient ring disposed in said recess so as to intervene between and sealingly engage said bottom wall of said recess and said larger diameter end of said generally cylindrical base, and so as to circumferentially surround said passageway on said larger diameter end surface of said generally cylindrical base; and
means defining a pressure inlet passage into said recess through said bottom wall of said recess, said pressure inlet passage being surrounded on said bottom wall by said resilient ring, whereby said pressure inlet passage is sealingly communicated, through said passageway in said generally cylindrical base, with said sensor chip.

6. The semiconductor pressure transducer of claim 5, wherein:
said annular collar has a radially outer annular base portion which radially intervenes between said larger diameter portion of said generally cylindrical base and said sidewall of said wall means, said radially outer annular base portion being attached to said radially inwardly projecting annular flange means.

7. The semiconductor pressure transducer of claim 6, wherein:
said annular collar is supported on said base by having an axially-facing end surface of said annular base portion thereof engage said bottom wall of said recess radially outwardly of said larger diameter end surface of said generally cylindrical base.

8. The semiconductor pressure transducer of claim 5, wherein:
an annular back-up ring axially interposed between and engaging said larger diameter end surface of said generally cylindrical base and said bottom wall of said recess.

9. The semiconductor pressure transducer of claim 8, wherein:
said annular collar is supported on said base by having an axially-facing end surface of an annular base portion of said annular collar engage an axially facing shoulder of a groove provided in said sidewall axially outwardly of said bottom wall.

10. The semiconductor pressure transducer of claim 9, wherein:
an annular back-up ring axially interposed between and engaging said larger diameter end surface of said generally cylindrical base and said bottom wall of said recess.

11. The semiconductor pressure transducer of claim 5, wherein:
said larger diameter portion of said generally cylindrical base is sandwiched axially between said radially inwardly projecting annular flange means of said annular collar and said resilient ring.

12. The semiconductor pressure transducer of claim 11, wherein:
said annular collar includes a radially outer annular base portion which annularly radially intervenes between said larger diameter portion of said generally cylindrical base and said sidewall of said recess.

13. The semiconductor pressure transducer of claim 12, wherein:
said annular collar is supported on said base by having an axially-facing end surface of said annular base portion thereof engage said bottom wall of said recess radially outwardly of said larger diameter end surface of said generally cylindrical base.

14. The semiconductor pressure transducer of claim 11, wherein:
said annular collar is supported on said base by having an axially-facing end surface of said annular base portion thereof engage an axially facing shoulder of a groove provided in said sidewall axially outwardly of said bottom wall.

15. The semiconduotor pressure transducer of claim 8, wherein:
said larger diameter portion of said generally cylindrical base is sandwiched axially between said radially inwardly projecting annular flange means of said annular collar and said annular back-up ring.

16. The semiconductor pressure transducer of claim 1, wherein:
said sidewall of said wall means is an annular sidewall, said annular sidewall has a diameter which is larger than said outer diameter of said larger diameter portion of said base so as to provide a clearance between said annular sidewall and said larger diameter portion of said base.

17. The semiconductor pressure transducer of claim 16, wherein:
said annular collar has a radially outer annular base portion connected to said radially inwardly projecting annular flange means, said annular collar being supported on said base by having an axially-facing end surface of said annular base portion thereof engage an axially facing shoulder of a groove provided in said sidewall axially outwardly of said bottom wall.

18. The semiconductor pressure transducer of claim 17, further comprising:
an annular back-up ring axially interposed between and engaging said larger diameter end surface of said generally cylindrical base and said bottom wall of said recess.

19. A semiconductor pressure transducer, comprising:
a housing having a recess therein;
a base having a first portion and a second portion, a juncture between said first and second portions defining a radially extending shoulder, a surface of said first portion sitting on a surface of said housing within said recess;
a collar having a portion resting against said housing and a portion resting against said shoulder of said base;
means for press fitting said collar against said housing;

a sensor chip generating an electrical signal in response to pressure in a medium, said chip being attached to said second portion of said base; and means for transmitting pressure from said medium to said chip through said housing.

20. The semiconductor pressure transducer of claim 19, wherein:

said collar has a portion which intervenes between said first portion and another surface of said housing defining said recess, and an inner diameter of said portion of said collar is larger than an outer diameter of said first portion so as to provide a clearance between said portion of said collar and said first portion, said clearance extending generally parallel to a direction said chip receives said pressure.

21. The semiconductor pressure transducer of claim 19, wherein:

said housing has an annular surface defining said recess adjacent to said first portion, an inner diameter of said annular surface of said housing being larger than an outer diameter of said first portion so as to provide a clearance between said annular surface of said housing and said first portion, said clearance extending generally parallel to a direction said chip receives said pressure.

22. The semiconductor pressure transducer of claim 19, further comprising a resilient ring disposed in said recess so as to intervene between said surface of said first portion and said surface of said housing within said recess.

* * * * *